P. Fraer,
Cattle Pump,
N° 33,243.        Patented Sep. 10, 1861.
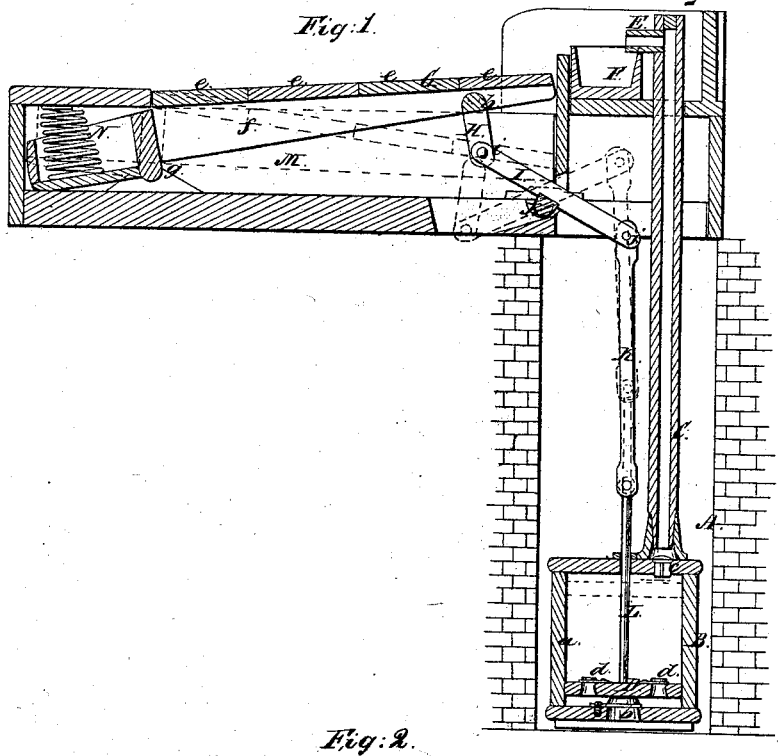
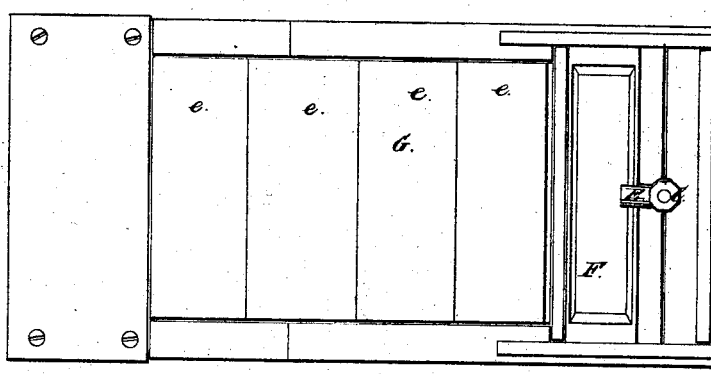
Witnesses:
J. W. Coombs
Wm. Turde
Inventor:
Peter Fraer
by J. Whum & Co.
attys

UNITED STATES PATENT OFFICE.

PETER FRAER, OF WEST SPRINGFIELD, PENNSYLVANIA.

IMPROVEMENT IN CATTLE-PUMPS.

Specification forming part of Letters Patent No. 33,243, dated September 10, 1861.

*To all whom it may concern:*

Be it known that I, PETER FRAER, of West Springfield, in the county of Erie and State of Pennsylvania, have invented a new and Improved Cattle or Stock Pump; and I do hereby declare that the following is a full, clear, and exact description of the same, reference being had to the accompanying drawings, making a part of this specification, in which—

Figure 1 is a side sectional view of my invention. Fig. 2 is a plan or top view of the same.

The object of this invention is to obtain a simple and economical pump by which cattle or stock may raise their own supply of water.

The invention consists in a novel arrangement of the platform with a pump, eduction-pipe and trough, all arranged, substantially as hereinafter described, to effect the desired result.

To enable those those skilled in the art to fully understand and construct my invention, I will proceed to describe it.

A represents a well in which the pump B is placed, said pump being composed of a cylinder $a$, having a valve $b$ in its bottom opening upward, and also having a valve $c$ in its top at the bottom of an eduction-pipe C, a piston D being within the cylinder and provided with two valves $d\ d$ opening upward. This pump may be constructed of metal. That at least would be the preferable material. The eduction-pipe C extends some distance above the top of the well and is provided with a spout E, underneath which there is a trough F.

G is a platform constructed of boards or planks $e$, attached to longitudinal bars $f$, which work on a fulcrum $g$.

To the under side of the platform G there is attached by a rock-bar $h$ a pendant H, the lower end of which is connected by a pivot $i$ to one end of a lever I, said lever being on a rock-shaft J. The opposite end of lever I is connected by a pivot $j$ to a link-bar K, the lower end of which is attached to the piston-rod L of the pump.

The platform G is fitted in a pit or excavation M, made in the earth at the top of the well, and the outer part of the bars $f$ or framing of the platform is provided with a spring or with weights. A spring N is shown in Fig. 1. This spring keeps the inner part of the platform elevated and the piston D at the bottom of the cylinder $a$, as will be fully understood by referring to Fig. 1.

The operation of the pump will be readily seen. An animal in passing on the platform G depresses it and the piston D is elevated, the water in cylinder $a$ above the piston being forced up through the valve $c$ and through the eduction-pipe C into the trough F, out of which the animal drinks. After the animal leaves the platform the spring N elevates the platform and forces down the piston D to the bottom of the cylinder $a$, the water as the piston descends passing through the valves $d\ d$ above the piston. It is designed to have the platform G settle quite gradually, so that an animal will not be at all discommoded while drinking, and the capacity of the pump should be such that a sufficiency of water will be raised for an animal to drink at each descent of the platform.

I do not confine myself to the precise arrangement of the eduction-pipe and valves of the pump, for they may be arranged in different ways, and two pumps may be employed and so connected as to operate alternately, one pump rising as the other falls. This, however, would be simply a duplication of the invention.

The water-trough F should be inclosed by a guard or fence to prevent the stock having access to it without passing on the platform G.

I do not claim, separately, any of the within-described parts; but

I do claim, and desire to secure by Letters Patent—

The combination of a platform G with a spring N attached, or its equivalent, the pump B, eduction-pipe C, and trough F, arranged for joint operation as and for the purpose set forth.

PETER FRAER.

Witnesses:
CYRENUS LINDSLEY,
RILEY POTTER.